Sept. 7, 1937.　　　　E. NAUJOKS　　　　2,092,422
PROCESS FOR THE PRODUCTION OF SOLID EASILY SOLUBLE FORMALDEHYDE
Filed Nov. 17, 1933
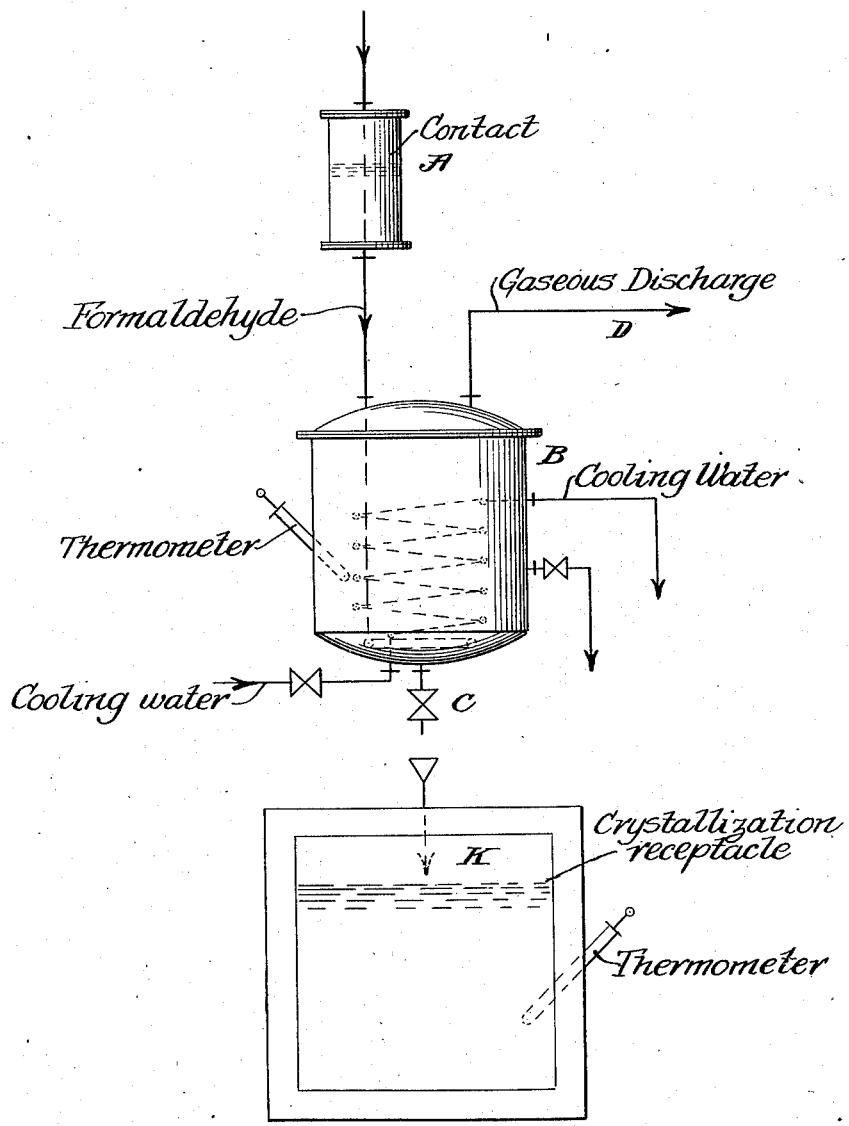
Inventor:
Erich Naujoks,
by　　　　
Att'y.

Patented Sept. 7, 1937

2,092,422

UNITED STATES PATENT OFFICE 2,092,422

PROCESS FOR THE PRODUCTION OF SOLID EASILY SOLUBLE FORMALDEHYDE

Erich Naujoks, Mainz-Mombach, Germany, assignor to Deutsche Gold und Silber, Scheideanstalt vormals Roessler, Frankfort-on-the-Main, Germany Application November 17, 1933, Serial No. 698,537
In Germany November 29, 1932

10 Claims. (Cl. 260—140)

This invention relates to a process for the production of solid, easily soluble formaldehyde and it is an object of the invention to form such formaldehyde from formaldehyde solutions subjected to a slow regulated cooling.

Solid formaldehyde or paraformaldehyde has hitherto been produced by subjecting formaldehyde solutions, particularly aqueous formaldehyde solutions, to distillation, especially in vacuo. Therein, substantially water with a relatively small proportion of formaldehyde passes over, while paraformaldehyde remains in the residue. The paraformaldehyde thus obtained is not readily soluble in water or other liquids simply by heating without the addition of auxiliary agents. Inasmuch however, as in most cases use can be made only of solutions of formaldehyde, it has been impossible, notwithstanding its greater formaldehyde content, for paraformaldehyde to replace aqueous formaldehyde, the transport costs of which are considerably increased on account of its high water content.

It was also known that the separations and precipitations of polymeric formaldehyde from concentrated aqueous solutions were soluble to a certain extent, that is, could again be dissolved by moderate heating. It is easily demonstrated however, that these separations lose their solubility after a relatively short time, and hence do not differ from ordinary paraformaldehyde.

If any attempt is made to vary the operative conditions for the production of paraformaldehyde from aqueous formaldehyde solutions, for example by concentrating an aqueous formaldehyde solution by heat and allowing the solution obtained to solidify, the result is likewise a paraformaldehyde which, directly after its production, has but weak solvent properties and loses even this after a very short time and passes over into ordinary difficultly drying and extremely difficultly soluble paraformaldehyde.

The drawing is a schematic view of apparatus capable of carrying out the process.

It has now been found possible to produce a stable easily soluble solid form of formaldehyde if formaldehyde solutions are subjected to a slow regulated cooling, the solid separations or precipitations obtained thereby being separated off by filtration, centrifuging or the like and then directly dried. In carrying out the new process it is advantageous to use the most highly concentrated formaldehyde solutions, that is, about 60–70% content, although the invention is not limited thereto. The solutions treated should preferably contain small quantities of water, as the final product still contains about 5–10% thereof. In some cases, for example, the small quantities of water present in the azetropic dehydration of aqueous formaldehyde solutions, according to German Patent No. 558,470, with sufficient excess of the clear solutions of the auxiliary substance, are sufficient, but it is by no means necessary to employ this process for obtaining suitable solutions in accordance with those of the present invention.

The said concentrated solutions can also be obtained by concentrating ordinary commercial formaldehyde solutions by passing in formaldehyde gas, at high temperature. Ordinary aqueous formaldehyde solutions can also be extracted with extraction agents, for example, acetic esters such as ethyl acetate, the result being an extract which contains sufficient formaldehyde which can be further treated according to the present invention.

It is advantageous if the said concentrated aqueous formaldehyde solutions are produced during the production of formaldehyde itself. The formaldehyde-containing vapors obtained by the oxidation of methyl alcohol can then be condensed and the desired high concentration be obtained by extracting the water or by adding concentrated formaldehyde. A particular advantageous method of preparing the desired concentrated formaldehyde solution consists in that the quantity of air or other oxygen-containing gases necessary for oxidizing is calculated so that a conversion of at least 70% results. If the vapors thus obtained are condensed at temperatures above 50° a clear condensate will be obtained, of about the following composition:

| | Per cent |
|---|---|
| Formaldehyde | 55–65 |
| Methanol | 10–15 |
| Water | 35–20 |

It is to be noted that the methanol content of the formaldehyde solutions treated is of advantage because, in accordance with the invention, easily soluble and stable products are obtained particularly from such solutions. Other substances, likewise retarding separation, such as ethyl alcohol, polyhydric alcohols, and the like, also act similarly to methyl alcohol.

The constituents which remain in vapor form during this hot concentration, principally nitrogen of the air together with small quantities of carbon dioxide, carry with them a little of the formaldehyde remaining in vapor form and which can be prepared to commercial formaldehyde in known manner in washing towers mounted thereafter.

If the precedingly described hot concentrated formaldehyde solution is allowed to cool without special precautionary measures, the entire mass will solidify after a relatively short time to a more or less solid paste of formaldehyde, having the defects mentioned above. But if care is observed, through a specially regulated cooling, to cool down the said concentrated formaldehyde solution within predetermined intervals of time, approximately within 12-24 hours, from about 65° C. to about 15° C., a granular, easily filtered modification of the formaldehyde, having a crystalline aspect, will separate off. The cooling rate must be adjusted preferably so that the decrease in temperature does not exceed 2-3° C. per hour. On the other hand, it is necessary to regulate the cooling at the end of the operation, so that during this period also the temperature does not drop below 1° per hour. The result of this precaution is that the separating or crystallizing procedure is interrupted at the proper time, before a too intensive polymerization of the solid product takes place.

The said control of the cooling rate can be obtained by introducing the formaldehyde solution into a container which is suitably insulated to control the heat given off. This control can also be obtained by indirectly tempering the container with water the temperature of which drops 1-3° per hour, according to the invention. The cooling may also take place spontaneously as long as, dependent on the construction of the apparatus, the cooling rate lies between the given limits of 1-3° per hour. As soon as the spontaneous rate drops below the minimum given limit (about 1° per hour) crystallization is interrupted and the crystalline mash obtained is further prepared as described hereinafter.

The above mentioned cooling or separating process may be carried out intermittently or continuously or semi-continuously.

If the preparation of formaldehyde solutions which predominantly contain solvents other than water, for example, acetic esters, is involved, the cooling rate, particularly when the formaldehyde concentration is substantially less, may be more rapid than that precedingly given, without in such case diminishing the solubility of the separated product.

According to the present invention it is further essential that the separations or precipitations be separated from the mother liquor, that is, that the crystallization which has taken place be interrupted at the proper time. If, with slow cooling, solidification were allowed to proceed to the end, the result would again be a solid paste of poorly soluble paraformaldehyde.

The interruption of the crystallization, that is, the separation of the solid formaldehyde from the mother liquor, can be undertaken when about 90% of the total formaldehyde content of the solution is precipitated. However, the filtering can also be done earlier whereby, if desired, several fractions of solid formaldehyde are obtained.

If the separating period is extended further or the cooling carried further more than 90% of solid formaldehyde is obtained. This product also has valuable properties, even though it is inferior to the above mentioned product concerning solubility.

On operating according to the manner precedingly described solutions of the concentration given, congeal to a solid crystalline mash from which the solid separation product, as distinguished from the talc-like solidification products obtained by known methods, is easily separated from the mother liquor by filtering, extracting, centrifuging or the like. At this point one skilled in the art will, by reason of the filtering property, at once know whether or not the process has been carried out in accordance with the present invention.

It has also been found particularly advantageous to add small quantities of electrolytes to the hot, properly concentrated aqueous formaldehyde solution before the slow cooling process. Basically acting compounds of all kinds may be used to advantage for this purpose. Especially favorable results were obtained by adding very small quantities (about 0.06% with respect to the amount of formaldehyde) of ammonia or other volatile base, such as alkylated or arylated amines; also other substances such as hexamethylenetetramine or salts thereof, calcium carbonate, zinc oxide, soda lye, etc.

The last step of the present process, which is necessary to obtain stable water-soluble substances, consists in that the products obtained after separation from the mother liquor be dried immediately and in the shortest possible time. The drying, preferably in vacuo, is continued until a product containing about 90-95% of formaldehyde is obtained. Drying is carried on preferably at temperatures of 30-40° in a vacuum of less than 100 mm. mercury column, and should terminate preferably in about 8-12 hours. Furthermore, it is advantageous that the drying take place directly after the filtering or extracting. If the product contains too much diluting water or if excessively thick layers are introduced into the drying oven, the drying will require a longer period of time, whereby the products obtained may easily lose some of the solvent capacity.

In the same manner as aqueous formaldehyde solutions, preferably still containing methanol, may be prepared according to the invention, solutions of formaldehyde in other alcohols, ketones, esters, for example acetic esters, etc. may also be used. It is essential in such case that the formaldehyde solutions also contain water, as otherwise filterable and easily soluble products are not obtained.

The result of operating according to the present invention is thoroughly surprising. It could not be inferred from the prior art that a modification of formaldehyde existed which for a long period of time, retains uniform excellent solubility in water and moreover, gives clear solutions, that is, is quantitatively soluble.

The new products are converted into a clear solution in water in a few minutes of moderate heating, whereby stable solutions of about 40% can be obtained directly. In order to produce such solutions it is sufficient to digest the new formaldehyde product for 10-20 minutes with water of 50-60°. It is also possible to obtain completely clear solutions at ordinary temperature if the new product is treated with water for about 24 hours with occasional agitation. The operations just described relate to the production of approximately 30 or 40% solutions. For the production of dilute solutions, about 3% as usual for disinfecting purposes, stirring in cold water is sufficient.

Even though there are at present no conclusive explanations of the results which take place in operating according to the present invention, it is conceivable that the separation and/or polymerization arising on slow cooling is interrupted at the proper time by the filtering, that is, separation from the mother liquid, as well as by the subsequent drying at the proper time, so that extremely long polymerization chains are avoided. It may be assumed that it is the latter which form the chief constituent of ordinary formaldehyde and are the cause of its slight solubility in water or other substances. It is also conceivable that the products obtained according to the invention, by reason of their specific physical properties, are particularly subject to the influence of the solvent, for example, water. At any rate, the products obtained in accordance with the invention, which form very easily triturable masses, differ considerably in external appearance from the hitherto obtained paraformaldehyde, which is obtained in the form of hard, horn-like and difficultly triturable pieces.

As stated, the products obtainable in accordance with the invention are extremely soluble in water. They are also considerably superior to the hitherto known paraformaldehyde relative to solubility in other substances. With the new preparation it is possible, in the most simple manner, to produce solutions having a low water or no water content of formaldehyde in organic solvents, for example, methyl alcohol, ethyl alcohol, acetic esters such as ethyl acetate or the like, which is often of special value for organic synthesis. In the dry state also the new products surpass ordinary paraformaldehyde greatly in reaction power. The chief advantage of the new preparation consists principally in that, for transporting it, which is of special importance for distant places, no flasks, vats or other liquid containers are necessary, but it can be packed, gas-tight, as a dry powder, wherewith the further advantage that only 5-10% of water need be transported, while this useless water ballast amounts to about 200% with the use of aqueous formaldehyde solutions.

Another very valuable technical property of the products attainable according to the invention consists in that when exposed to the air they give off formaldehyde in the form of gas easily and finally completely volatilize. Hence, the new product can be used for disinfection purposes in rooms, etc. spread out in thin layers without it being necessary, as heretofore, to atomize or vaporize it by heat or the use of chemical agents.

*Examples*

1. The hot, formaldehyde-containing reaction gases obtained in the catalytic oxidation of methanol (in A) are passed into a reservoir (B) which is maintained at a temperature of 62-67°, by suitable cooling. A mixture of 60.5% formaldehyde, 10.5% methanol, 0.02% formic acid and 20.98% water thereby condense from the reaction gases. By maintaining the cooling temperature within the limits given the composition of the condensate remains constant. The vapors passing from the reservoir, consisting chiefly of uncondensed formaldehyde and methanol, nitrogen and the gaseous by-products of the reaction, are (through D) prepared in a connected absorption plant into commercial formaldehyde solution and methanol in known manner. The condensate, at 65° C., is passed through a discharge cock (C) into a crystallizing receptacle (K) insulated against heat radiation, while still hot with 0.25 part of 25% ammonia solution, calculated to 100 parts of formaldehyde, agitated and slowly and uniformly cooled down in the course of 20 hours to 15° C. After the elapse of this time a portion of the formaldehyde is precipitated in good crystallizable, filterable form from the solution. The moist paraformaldehyde is immediately filtered and dried 8 to 10 hours in vacuo at 30° C. A snow white product containing 93.2% by weight of formaldehyde is obtained, which can be easily comminuted (triturated) and, as described above, provides with water clear, stable formaldehyde solutions of any commercial concentration.

2. A 30% (approximately) aqueous formaldehyde is distilled with about three times its weight of ethyl acetate for about 30 hours. The hot solution remaining in the residue, which still contains about 10-20% formaldehyde, is then cooled down so that the temperature drops about 3° per hour. The crystalline mash obtained is then extracted in the ester atmosphere and if necessary, then washed with some pure ethyl acetate and finally dried as in Example 1.

I claim:

1. A process for the production of a solid soluble modification of formaldehyde comprising cooling a concentrated aqueous solution of formaldehyde at a rate of 1° C. to 3° C. per hour.

2. A process for the production of a solid soluble modification of formaldehyde comprising cooling a concentrated aqueous solution of formaldehyde at a rate of 1° C. to 3° C. per hour and then separating the solid separations formed from said solution.

3. A process for the production of a solid soluble modification of formaldehyde comprising cooling a concentrated aqueous solution of formaldehyde at a rate of 1° C. to 3° C. per hour, then separating the solid separations formed from said solution and immediately drying said solid separation.

4. A process for the production of a solid soluble modification of formaldehyde comprising cooling a concentrated aqueous solution of formaldehyde at the rate of 1° C. to 3° C. per hour, filtering the solid separations from said solution and then drying said solid separations.

5. A process for the production of a solid soluble modification of formaldehyde comprising cooling a concentrated aqueous solution of formaldehyde at the rate of 1° C. to 3° C. per hour, filtering the solid separations from said solution and then drying said solid separations in a vacuum.

6. A process for the production of a solid soluble modification of formaldehyde comprising cooling a concentrated aqueous solution of formaldehyde at the rate of 1° C. to 3° C. per hour, filtering the solid separations from said solution and then drying said solid separations in a vacuum at a temperature between 30 to 40° C.

7. A process for the production of a solid soluble modification of formaldehyde comprising cooling a concentrated aqueous solution of formaldehyde at the rate of 1° C. to 3° C. per hour, filtering the solid separations from said solution and then drying said solid separations in a vacuum of less than 100 mm. mercury column.

8. A process for the production of a solid soluble modification of formaldehyde comprising cooling an aqueous concentrated solution of formaldehyde containing methanol at a regulated rate between 1° C. and 3° C. per hour.

9. A process for the production of a solid soluble modification of formaldehyde comprising cooling a concentrated aqueous solution of formaldehyde containing basically acting compounds at a regulated rate between 1° C. and 3° C. per hour.

10. A process for the production of a solid soluble modification of formaldehyde comprising cooling a formaldehyde solution containing 55 to 65% formaldehyde, 10 to 15% methanol, and 35 to 20% water at a rate between 1° C. and 3° C. and then separating the solid separations formed.

ERICH NAUJOKS.